J. C. WILSON.
MEANS FOR MEASURING ELECTRICAL ENERGY.
APPLICATION FILED AUG. 14, 1913.

1,236,130.

Patented Aug. 7, 1917.

Witnesses
Robert H Weir
Geo. B. Jones

Inventor
John C. Wilson
Edwin B. H. Tower Jr.
atty.

J. C. WILSON.
MEANS FOR MEASURING ELECTRICAL ENERGY.
APPLICATION FILED AUG. 14, 1913.
1,236,130.
Patented Aug. 7, 1917.
2 SHEETS—SHEET 2.
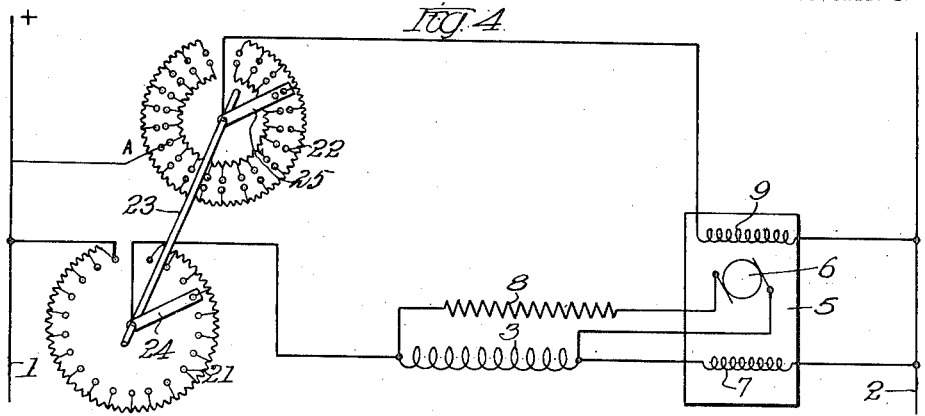
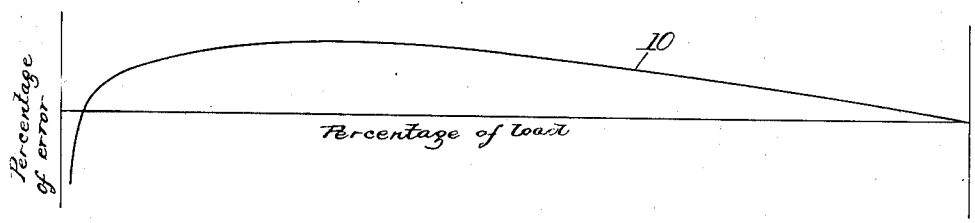
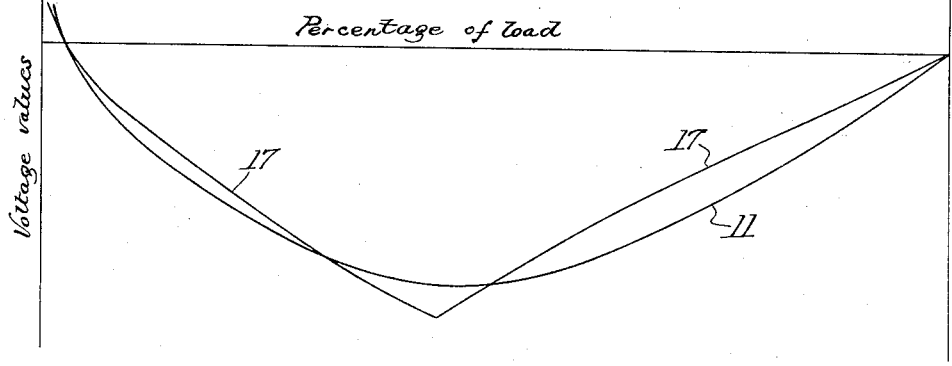
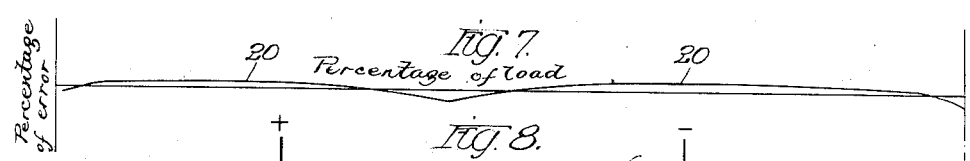
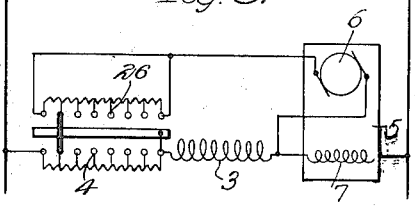
Witnesses:
Robert H. Weir
Geo. B. Jones.
Inventor
John C. Wilson
Edwin B.  
Atty.

UNITED STATES PATENT OFFICE.

JOHN C. WILSON, OF MILWAUKEE, WISCONSIN, ASSIGNOR TO THE CUTLER-HAMMER MFG. CO., OF MILWAUKEE, WISCONSIN, A CORPORATION OF WISCONSIN.

MEANS FOR MEASURING ELECTRICAL ENERGY.

1,236,130.     Specification of Letters Patent.     Patented Aug. 7, 1917.

Application filed August 14, 1913. Serial No. 784,684.

*To all whom it may concern:*

Be it known that I, JOHN C. WILSON, a citizen of the United States, residing at Milwaukee, in the county of Milwaukee and State of Wisconsin, have invented new and useful Improvements in Means for Measuring Electrical Energy, of which the following is a full, clear, concise, and exact description, reference being had to the accompanying drawing, forming a part of this specification.

My invention relates to means for measuring electric energy.

The object of my invention, generally speaking, is to provide improved means which shall measure electric energy accurately under widely varying conditions.

The integrating wattmeters ordinarily used in commercial service are connected across the mains with their field coils in series with the load and their armatures in parallel relation therewith. The torque tending to rotate the armature shaft is thus proportional to the product of the series coil amperes and the armature voltage. The retarding action of the usual disk which rotates between magnets is proportional to the speed of rotation. Where it is desired to regulate the load by means of a rheostat connected in series therewith, however, such wattmeters do not give reliable results for the reason that there is a variation of current in the voltage coil of the meter resulting in variations in temperature, and, hence, in variations in the resistance of said coil, thereby introducing errors into the readings.

My invention has, as a further object, to provide compensating means which will enable wattmeters to give accurate readings under varying voltage conditions such as just outlined.

An additional object of my invention is to provide a wattmeter having auxiliary features which adapt it particularly for use in connection with meters designed to measure automatically the flow of fluids such as described in the Patent to Carl C. Thomas, No. 1,222,492, of April 10th, 1917.

A further object is to provide compensating means for a wattmeter, which shall be independent of and external to said meter, whereby changes in the structure of the wattmeter proper are not required.

I have illustrated somewhat diagrammatically in the accompanying drawings several embodiments of the invention. The invention may be embodied in other forms, of course, and accordingly I do not limit myself to the present showing.

Fig. 4 shows a modified form of compensating means.

Figs. 5, 6 and 7 are explanatory diagrams.

Fig. 8 is a further modification of compensating means.

Figure 1:
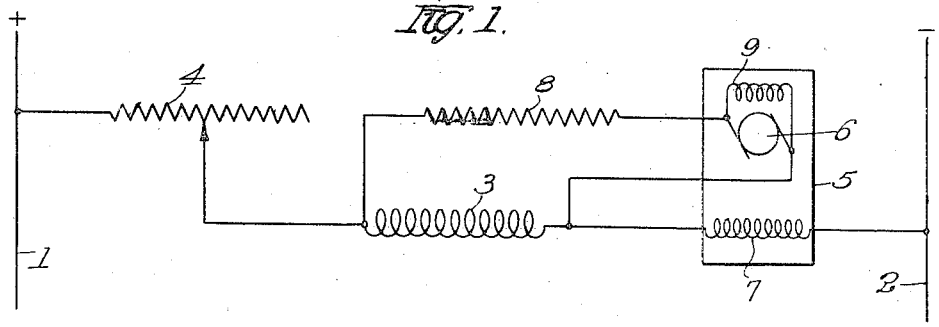
Figure 1 shows a wattmeter connected with a suitable load, the latter having a regulating rheostat connected in series therewith.

In the various figures, the positive and negative supply mains are indicated by reference letters 1, 2. A suitable load 3 is connected across said mains in series with a regulating rheostat 4, which may be of any approved type. The load 3 may be assumed to be the heating coil of a fluid meter such as described in the Thomas patent above referred to, although the showing is merely diagrammatic and therefore, said load may be assumed to be almost any means for consuming electric energy. In order to measure the energy consumed by said load, I have illustrated a suitable wattmeter 5. This instrument may be assumed to be a suitable watthour meter provided with a train of gears and a dial on which the watthours may be read directly. Said wattmeter is provided with the usual parts, most of which are not illustrated as they form no part of the present invention. The rotating armature 6, however, is indicated on the diagram, said armature being supported on a suitable spindle. On this same spindle is mounted the usual metallic disk, said disk rotating between magnet poles to give the necessary braking effect. Around the armature the usual series coils 7 are arranged, the latter being connected in series with the load 3.

The armature 6 is connected across the load 3 and usually has in circuit therewith a resistance 8, which cuts down the voltage drop across said armature. With this arrangement, and assuming that the value of the regulating resistance 4 remains constant, the torque tending to rotate the armature is proportional to the voltage across the same, multiplied by the current in the field coils expressed in amperes. The retarding action of the magnets on the disk is proportional to its speed of rotation. The friction of the rotating element may be compensated for in various ways. The provision of a compensating coil 9 connected across the armature and arranged adjacent to the field coils so as to augment the latter, is one well known means for accomplishing this result. The frictional torque is nearly constant for different speeds and inasmuch as the current, both in the armature and in the compensating coil 9, is practically constant at different loads, the wattmeter readings indicated on the dial will be accurate, even where the load 3 is assumed to be an incandescent lighting circuit, for example, the resistance of which may be varied by turning off or on more lamps.

Where said load is an electric heating coil in such a fluid meter as that referred to above, or where for other reasons it is desirable or necessary to operate the controlling rheostat 4 to vary the resistance in series with said load, the meter will not read accurately. For example, as the resistance 4 is increased and the wattage in the heating unit 3 decreases from full load to a smaller value, the voltage across said heating unit, as well as the current through it, decreases. This decreases the current through the voltage circuit of the wattmeter and as a result, there is a variation in the temperature of the different elements, constituting the circuit, accompanied by a consequent variation in their resistance, the latter being followed by a variation in the current flow therethough. Variations in the temperature of the atmosphere surrounding the meter also cause variations in the resistance of the said circuit so that at high atmospheric temperature the current flowing therethrough for a given voltage is less than at low temperature. Furthermore, the braking disk varies in effectiveness for any given speed with variations in temperature of said disk. This is due to the increased resistance of said disk which cuts down the currents induced therein by the magnets. Accordingly, the retarding action of the disk decreases as the temperature increases. Said disk may not be affected by the heat dissipated from the meter coils, as it is usually located at the bottom of the meter housing, but it is affected, however, by variations in atmospheric temperature.

It has been proposed heretofore to eliminate certain of the above errors by making the conductors of the armature circuit and the braking disk of such material that the increased resistance of the former and the decreased retarding action of the latter will off-set each other. This means that the armature circuit, including its resistance 8, must have a temperature coefficient equivalent to that of the disk. This disposition of materials permits the instrument to be satisfactorily compensated for variations in atmospheric temperatures. With such an arrangement, however, errors will be caused at the different loads by the variation in the voltage across the heating unit, the resultant variation in current through the armature circuit, and the consequent variation in the resistance of said circuit, due to the heating effects of said current.

This error, due to variations in temperature of the armature circuit because of variations in current flowing through it, might be prevented by making the armature circuit of a material having a zero temperature coefficient, but if this is done, variations in atmospheric temperature which affect the retarding action of the disk will no longer be compensated.

Moreover, since the retarding or augmenting effect (as the case may be) of the compensating current is about proportional to the product of the current through the armature and the current through the compensating coil, this effect decreases very rapidly as the load decreases, and at the lower loads where the friction torque becomes an appreciable percentage of the total torque, the compensating torque has decreased to a very low value, and at the low loads it becomes impossible to augment the armature torque sufficiently by this means to compensate satisfactorily for friction.

More specifically, it is an object of my invention to provide means for properly compensating for the errors introduced into the readings due to the conditions just described.

In order to understand more fully the nature of the above inaccuracies, encountered when attempt is made to measure with an ordinary watthour meter varying wattages due to varying voltages across a fixed resistance, reference may be had to Fig. 5, in which a curve 10 is plotted, the abscissa of which represents percentage of load up to 100%, and the ordinates of which represent percentage of error of the readings, the base line representing zero error. The values indicated by this curve are taken on the assumption that the instrument has been so designed that its accuracy is not effected by variations in atmospheric temperature. Said curve has two important characteristic features. Beginning at its highest point to the left of the middle, it gradually drops off to full load due to the increased temperature of the voltage circuit during increased loads. Said curve gradually falls off from the maximum point as zero load is approached because of the increasing ratio of frictional torque to turning torque. It is apparent that the above features cannot be compensated for by any of the usual methods.

Before describing more fully my improved compensating means for overcoming the above difficulty, reference may be had to Fig. 6, in which is shown a curve 11 plotted with reference to curve 10 in Fig. 5 and showing the values of the voltage at each different load, which, if applied across the compensating coil of the wattmeter, would increase or retard the movement of the rotating elements so as to effect accurate integration. Values of voltage having such direction that they will retard the movement of the rotating element are plotted below the zero line and those having such direction as to increase said movement are plotted above the line.

Figure 2:
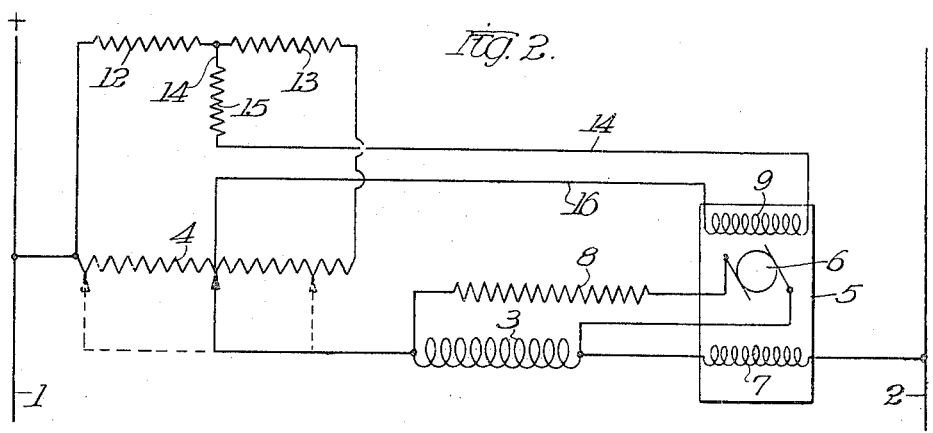
Fig. 2 shows a wattmeter connected with the same load and provided with compensating means to render accurate the readings thereof under variations in voltage due to the operation of the rheostat.

In Fig. 2, I have illustrated a compensating system, whereby substantially the desired voltage values may be obtained. In said figure, the same reference characters are used as in Fig. 1 where corresponding parts are indicated. In addition, I have provided a resistance in two sections 12, 13 connected across the terminals of the rheostat 4, the combined value of said resistances being large compared with that of the rheostat. To a suitable point common to said resistance sections, a conductor 14 leads to the compensating coil 9, a resistance 15 being usually included in the circuit with said compensating coil. A second conductor 16 leads from said compensating coil to a suitable point in the rheostat resistance 4. As the rheostat arm (indicated by the arrow) moves from the left hand position toward the right, it is apparent that the voltage across the compensating coil increases in value until the full line position is reached. This is due to the fact that the voltage across the compensating coil is somewhat proportional to the voltage drop across that part of the rheostat between the position of the movable lever indicated by the full lines and its starting point. The voltage drop across this section of the rheostat becomes a maximum when the rheostat lever reaches the full line position. After this position is passed, the voltage drop across the above mentioned section of the rheostat must decrease on account of the gradual decreasing current through the rheostat. Consequently the voltage across the compensating coil decreases. When the rheostat lever reaches such a position that the ratio of the resistance of that part of the rheostat between the full line position of the lever and the starting point to the resistance between the full line position and the right hand position equals the ratio of resistance 12 and 13, the voltage across the compensating coil will be zero. After such a point is reached the voltage across the compensating coil will increase and will be in the opposite direction.

The voltage values produced by the movement of the rheostat arm just described are plotted in Fig. 6 and indicated by the curve 17. By comparing this curve with the desired curve 11, it will be seen that the values actually attained are quite similar to the theoretically perfect values. In other words, the compensating system illustrated in Fig. 2 gives very accurate results which answer every practical purpose.

By reference to the curves in Fig. 6, it will be seen that the voltage across the compensating coil at what has been called the full line position in Fig. 2, is somewhat greater than is necessary. However, the voltage can be further decreased or increased at this point by increasing or decreasing the resistance 15 so that this value may be suitably modified. Furthermore, the point of attachment of the conductor 16 to the resistance 4 may be moved either to the right or to the left, thereby shifting the position of the maximum voltage value in Fig. 6. Furthermore, the zero voltage value or the point where the curves cross the line in Fig. 6 may also be shifted from the right or to the left by varying the relative values of the resistances 12 and 13 which varies the point indicated by the right hand dotted line position of the arrow in Fig. 2. In other words, the above described method of compensation is very flexible and easily adjusted to suit the characteristic error found in any type of watthour meter.

Figure 3:
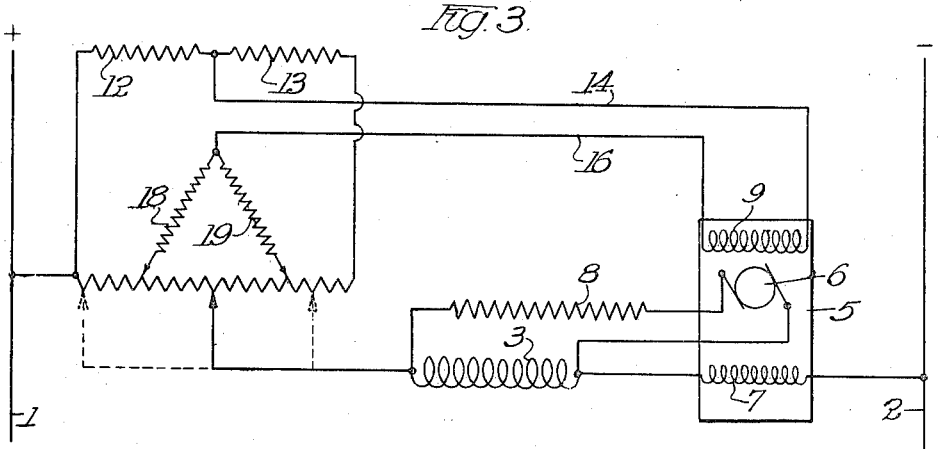
Fig. 3 is a somewhat similar view showing certain modifications in the compensating means.

As a further refinement I have shown in Fig. 3 a diagram similar to that shown in Fig. 2 except that instead of the single resistance 15, I provide a plurality of resistance branches 18, 19 in parallel. This arrangement has the effect of reducing the amount by which the actual voltage values differ from the theoretically perfect voltage values. In Fig. 7 I have plotted a curve 20 showing the percentage of error of the system illustrated in Fig. 2. By providing the further refinement in Fig. 3, the percentage of error is further decreased. This increased accuracy is attained by increasing the number of nodes and therefore decreasing the length of each node. The number of parallel branches and, therefore, the number of nodes might be increased until the curve 20 conforms almost exactly with the line of zero error.

In Fig. 4 I have illustrated a modified form of compensating means wherein the rheostat 21 operates a second rheostat 22, preferably by means of a mechanical connection 23, the second rheostat being connected across the line in series with the compensating coil. Said rheostat 22 is of such design that the voltage across the compensating coil can be regulated in accordance with the desired law simply by operating the main rheostat 21, which varies the load 3. Although in this figure the rheostats are indicated as being provided with rotating arms 24 and 25 both fast to a shaft 23, it is to be understood that this arrangement is merely intended as typical of various mechanical connections which may be effected.

In Fig. 8 I have illustrated a modified form of compensating means which permits the compensating coil to be dispensed with. The rheostat 26, which is here illustrated as of the sliding type, although, of course, it may be of any suitable type, is connected directly in series with the armature 6 and is so designed as to vary the armature current in the desired manner. Starting from full load the rheostat gradually adds resistance to the armature circuit until the point of maximum error is reached. Then as the low load is approached the resistance is gradually cut out to allow more current to pass through the armature and thus compensate for the error as indicated by the left hand end of the error curve in Fig. 5.

Among the many advantages of the above system of compensation over and above the attainment of the requisite degree of accuracy, it may be mentioned that the compensating system is external to and independent of the meter, whereby the latter need not be of special construction, but may simply be connected in the desired circuit.

The invention, of course, is not limited to the detailed circuit connections illustrated, nor is it dependent upon the use of any particular type of apparatus or device indicated diagrammatically on the drawings. Accordingly, I desire to cover in the appended claims whatever suitable equivalent means may be employed to obtain the desired results.

What I claim as new and desire to secure by Letters Patent of the United States is:

1. In combination, a load, a regulating rheostat in series therewith, an integrating wattmeter connected to said load to indicate the wattage consumption thereof, and means for compensating the wattmeter for variations in the voltage across the load due to operation of said rheostat.

2. In combination, a load, a regulating rheostat in series therewith, an integrating wattmeter connected to said load to indicate the wattage consumption thereof, and means for compensating the wattmeter for variations in the voltage circuit thereof due to changes in the potential drop across said load.

3. In combination, a load subjected to a variable voltage, a wattmeter connected thereto to indicate the electrical consumption thereof, and means external to and independent of said meter for modifying the operation thereof to compensate for said variations in voltage.

4. In combination, a load, a regulating rheostat in series therewith, a wattmeter connected thereto to indicate the electrical consumption thereof and compensating means for said meter, said compensating means being controlled by said regulating rheostat.

5. The combination with a heating unit and a variable resistance for controlling the energy consumed thereby, of a wattmeter having its field coils in series with said unit, its armature coils connected across said unit, and a compensating field coil connected at one end to an intermediate point on said variable resistance and connected at the other end to points on opposite sides of said intermediate point.

6. The combination with a heating unit, of a variable resistance connected in series therewith, a wattmeter having its field coils in series with said unit and its armature coils connected across said unit and a compensating field coil having connections from one end to an intermediate point on said variable resistance, a second resistance of greater value than said first resistance connected in parallel with the latter and a connection from the other end of said compensating coil to an intermediate point on said second resistance.

7. A compensating circuit for a wattmeter which is connected in a circuit having a variable resistance therein for varying the voltage applied to the load whose wattage consumption the wattmeter is adapted to measure, comprising a compensating coil for the wattmeter having one end thereof connected to intermediate points on the variable resistance and the other end thereof connected to the ends of said resistance through a divided circuit each branch of which has a resistance therein.

8. In a compensating system for wattmeters a regulating resistance for varying the voltage applied to the load whose wattage consumption the wattmeter is adapted to measure, a second resistance in parallel to the first and connections from an intermediate point on each resistance to a compensating winding in the wattmeter.

9. In a compensating system, a wattmeter, a regulating resistance, a second resistance connected in parallel therewith, a connection from an intermediate point on one of said resistances to said wattmeter and a plurality of parallel connections from successive points on said other resistance to said wattmeter, said parallel connections including additional resistances.

10. In a compensating system for wattmeters, a compensating coil, a variable resistance, a connection from one terminal of said coil to an intermediate point on said resistance, a second resistance of higher value than said first resistance connected at one end to an end of said first resistance, and connected at the other end to the other end of said first resistance and a connection from an intermediate point on said second resistance to the other end of said coil.

11. In combination, positive and negative supply mains, a heating resistance and a regulating rheostat connected in series with each other across said mains, a compensating coil for a wattmeter, a connection from an intermediate point on said rheostat to said compensating meter coil, a second resistance of higher value than said rheostat resistance connected to the terminals of the latter, a second connection from an intermediate point on said second resistance to said compensating coil and a resistance included in said connections, whereby adjustment of the rheostat from maximum load position to positions of decreasing load will cause first an increase in the voltage impressed on said compensating coil followed by a gradual decrease thereof.

12. The combination with a wattmeter of a compensating field coil and means for varying the voltage impressed on said compensating coil in accordance with variations in the temperature and friction of the meter at the different loads being measured to compensate the meter for temperature changes in the meter coils and for friction of the meter parts.

13. In a compensating system for wattmeters, a compensating wattmeter coil, a variable resistance, a second resistance in parallel therewith, a conductor connected to an intermediate point on said second resistance and adapted to be connected to one terminal of the wattmeter compensating coil, and a plurality of conductors extending in parallel from different points along said variable resistance to a common point adapted to be connected to the other terminal of said compensating coil.

14. The method of measuring the electrical consumption of a load in series with a means for varying the energy supply thereto, which consists in using the current supply to said load and the voltage drop across said load to operate a wattmeter and supplying the wattmeter with a supplemental voltage which is varied in accordance with variations in the energy supply to compensate the wattmeter for variations in the load.

15. The method of compensating a wattmeter which is used to measure the energy consumption of a load in series with a variable resistance, which consists in applying a supplemental voltage to the wattmeter and varying said voltage in accordance with variations in the variable resistance.

16. The method of compensating a wattmeter used to measure electrical energy consumed by a resistance unit, the quantity of said energy being varied by varying the voltage supply to said unit, which consists in varying the torque in the wattmeter by means of a compensating coil and varying the energy supply to said coil in accordance with variations in the voltage across said resistance.

17. The method of measuring the electrical energy consumption of a load to which a variable voltage is supplied, which consists in using the current supply to said load and the voltage drop across said load to operate a wattmeter, and furnishing a separate supplemental supply of energy to the wattmeter which is varied in accordance with variations in the temperature and friction of the meter at different loads.

18. The combination with a source of energy of means for varying the supply of energy from said source, an energy measuring means for measuring the energy supply, means dependent upon the energy varying means for compensating the energy measuring means for errors at different rates of energy supply.

19. The combination with an electric wattmeter measuring a variable load of means for varying said load and means for compensating the errors in the wattmeter at different loads, said compensating means being dependent on the load varying means.

20. The combination with an integrating wattmeter connected to an electric circuit having a load connected thereto of means for compensating the wattmeter for variations in the voltage across the load.

21. The combination with an integrating wattmeter connected to an electric circuit having a load connected thereto of means for automatically compensating the wattmeter for variations in the voltage across the load.

22. The combination with an integrating wattmeter connected to an electric circuit having a load connected thereto of means comprising parts independent of regular wattmeter operating means for compensating said wattmeter for variations in the voltage across the load.

23. The combination with an integrating wattmeter connected to an electric circuit having a load connected thereto of means comprising parts independent of the regular wattmeter operating means for automatically compensating said wattmeter for variations in the voltage across the load.

24. The combination with an electric circuit having a load connected thereto of means for varying the voltage applied to said load, an integrating wattmeter for measuring the wattage consumption of said load and means controlled by the voltage varying means for compensating the wattmeter for variations due to changes in the voltage across the load.

25. The combination with an electric circuit having a load connected thereto of means in series with said load for varying the voltage applied thereto, an integrating wattmeter for measuring the wattage consumption of said load and means controlled by the voltage varying means for compensating the wattmeter for variations in its operation due to changes in the voltage across the load.

26. The combination with an electric circuit having a load connected thereto of a rheostat in series with said load for varying the voltage applied thereto, an integrating wattmeter for measuring the wattage consumption of said load and means responsive to changes in the rheostat for compensating the wattmeter for variations in its operation due to changes in the voltage across the load.

In witness whereof, I have hereunto subscribed my name in the presence of two witnesses.

JOHN C. WILSON.

Witnesses:
C. R. POE,
F. H. HUBBARD.